United States Patent
Noda

(10) Patent No.: US 12,298,285 B2
(45) Date of Patent: May 13, 2025

(54) SAMPLE MEASUREMENT DEVICE AND MEASUREMENT PARAMETER SETTING ASSISTANCE DEVICE

(71) Applicant: Shimadzu Corporation, Kyoto (JP)

(72) Inventor: Akira Noda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 517 days.

(21) Appl. No.: 17/297,320

(22) PCT Filed: Nov. 29, 2018

(86) PCT No.: PCT/JP2018/044061
§ 371 (c)(1),
(2) Date: May 26, 2021

(87) PCT Pub. No.: WO2020/110268
PCT Pub. Date: Jun. 4, 2020

(65) Prior Publication Data
US 2021/0405002 A1 Dec. 30, 2021

(51) Int. Cl.
*G01N 30/86* (2006.01)
*G01N 30/30* (2006.01)

(52) U.S. Cl.
CPC ......... *G01N 30/8665* (2013.01); *G01N 30/30* (2013.01); *G01N 30/8624* (2013.01); *G01N 30/8693* (2013.01); *G01N 2030/862* (2013.01)

(58) Field of Classification Search
CPC ............................ G01N 30/8665; G01N 30/30
See application file for complete search history.

(56) References Cited

U.S. PATENT DOCUMENTS

| | | | | |
|---|---|---|---|---|
| 2006/0080040 | A1* | 4/2006 | Garczarek | H01J 49/0027 702/19 |
| 2009/0055101 | A1* | 2/2009 | Strubel | H01J 49/0036 702/19 |
| 2012/0271556 | A1* | 10/2012 | Szacherski | G16B 40/10 702/22 |

(Continued)

FOREIGN PATENT DOCUMENTS

| | | |
|---|---|---|
| JP | 2015-166726 A | 9/2015 |
| WO | 2013099949 A1 | 7/2013 |

OTHER PUBLICATIONS

Dai Shengyun, "Establishment and Reliability Research of HPLC Analysis Design Space of Traditional Chinese Medicine", CNKI Master Electronic Journal, Issue 8, 2016.

(Continued)

*Primary Examiner* — Ricky Go
(74) *Attorney, Agent, or Firm* — Muir Patent Law, PLLC

(57) ABSTRACT

A sample measurement device includes a measurement unit (1) configured to measure a sample, and a controller (2) configured to analyze a measurement result of the measurement unit. The controller (2) is configured to estimate and acquire a measurement result under another measurement condition using a model formula based on measurement results under a plurality of measurement conditions with different measurement parameter conditions, and estimate a distribution of a measurement quality indicator with respect to a measurement parameter based on the estimated measurement result.

10 Claims, 6 Drawing Sheets

(56) References Cited

U.S. PATENT DOCUMENTS

| | | |
|---|---|---|
| 2014/0315322 A1 | 10/2014 | Yagi et al. |
| 2015/0253293 A1* | 9/2015 | Ohashi |
| 2017/0052159 A1* | 2/2017 | Harant ............... G01N 30/8693 |
| 2019/0072529 A1* | 3/2019 | Andrawes .......... G01N 30/8651 |

OTHER PUBLICATIONS

First Office Action dated Jul. 26, 2023 for corresponding Chinese Patent Application No. 201880099710.0.

Written Opinion by the International Search Authority for PCT application No. PCT/JP2018/044061 dated Feb. 26, 2019, submitted with a machine translation.

"ICH Harmonised Tripartite Guideline Pharmaceutical Development Q8(R2) Current Step 4 version", Aug. 2009.

"Bayesian Optimization Algorithm," available at: https://jp.mathworks.com/help/stats/bayesian-optimization-algorithm.html, submitted with an English translation (downloaded this or similar webpage on Oct. 24, 2018).

Notice of Reasons for Refusal mailed Jul. 5, 2022 for corresponding Japanese Patent Application No. JP 2020-557489, submitted with a machine translation.

* cited by examiner

SAMPLE MEASUREMENT DEVICE AND MEASUREMENT PARAMETER SETTING ASSISTANCE DEVICE

TECHNICAL FIELD

The present invention relates to a sample measurement device, a program, and a measurement parameter setting assistance device.

BACKGROUND ART

Conventionally, a sample measurement device is known. Such a sample measurement device is disclosed in Japanese Patent Laid-Open No. 2015-166726, for example.

Japanese Patent Laid-Open No. 2015-166726 discloses a chromatogram (sample measurement device) that analyzes a sample. Furthermore, Japanese Patent Laid-Open No. 2015-166726 discloses a chromatographic data processor that displays a list of unexamined analytical conditions when a plurality of parameters of analytical conditions are changed in method scouting in which one sample is analyzed under a plurality of conditions to find an optimum analytical condition for the sample.

Conventionally, a quality control method is known in which the relationship between parameters used for sample analysis and a quality indicator is obtained as a response surface, and the range of the parameters allowed in design is calculated as a design space.

PRIOR ART

Patent Document

Patent Document 1: Japanese Patent Laid-Open No. 2015-166726

SUMMARY OF THE INVENTION

Problems to be Solved by the Invention

In the quality control method for calculating the design space described above, when the response surface is created by fitting to a model formula based on several measurement points, a large number of measurement points increases the accuracy of the response surface, and a small number of measurement points decreases the accuracy of the response surface. Therefore, it is necessary to take a sufficiently large number of measurement points and accurately calculate the design space. Alternatively, it is necessary to set a sufficient safety factor in the design space. That is, it is necessary to set a safety factor in the design space calculated from the measurement results and appropriately narrow the range of the design space. On the other hand, in the chromatographic data processor disclosed in Japanese Patent Laid-Open No. 2015-166726, the list of the unexamined analytical conditions can be displayed when the plurality of parameters of the analytical conditions are changed in the method scouting to find the optimum analytical condition for the sample, and thus measurement points under the analytical condition to be analyzed next can be easily determined. However, even in the chromatographic data processor disclosed in Japanese Patent Laid-Open No. 2015-166726, it is difficult to significantly reduce or prevent an increase in the number of measurement points under the analytical conditions in order to accurately calculate the design space. When the quality indicator has a linear relationship with the parameters, it is not difficult to set an appropriate safety factor empirically, but when the quality indicator has a non-linear relationship with the parameters, like a resolution as a quality indicator of the chromatograph, it is difficult to set a necessary and sufficient safety factor without excessively narrowing the design space. Consequently, it is difficult to accurately calculate the design space. Therefore, it is desired to accurately calculate an allowable design space (the range of measurement parameters) while significantly reducing or preventing an increase in the number of measurement points under the analytical conditions.

The present invention is intended to solve at least one of the above problems. The present invention aims to provide a sample measurement device, a program, and a measurement parameter setting assistance device that each enable accurate calculation of the allowable range of a measurement parameter while significantly reducing or preventing an increase in the number of measurement points.

Means for Solving the Problems

In order to attain the aforementioned object, a sample measurement device according to a first aspect of the present invention includes a measurement unit configured to measure a sample, and a controller configured to analyze a measurement result of the measurement unit. The controller is configured to estimate and acquire a measurement result under another measurement condition using a model formula based on measurement results under a plurality of measurement conditions with different measurement parameter conditions, and estimate a distribution of a measurement quality indicator with respect to a measurement parameter based on the estimated measurement result.

In the sample measurement device according to the first aspect of the present invention, as described above, the controller is configured to estimate and acquire the measurement result under another measurement condition using the model formula based on the measurement results under the plurality of measurement conditions with different measurement parameter conditions, and estimate the distribution of the measurement quality indicator with respect to the measurement parameter based on the estimated measurement result. Accordingly, a safety factor can be set statistically based on the distribution of the measurement quality indicator, and thus the necessary and sufficient safety factor can be easily set based on the statistics without excessively narrowing the allowable range of the measurement parameter. Consequently, the allowable range of the measurement parameter can be accurately calculated. Moreover, the measurement result can be estimated using the model formula, and thus the allowable range of the measurement parameter can be calculated without excessively increasing the number of measurement points. Thus, the allowable range of the measurement parameter can be accurately calculated while an increase in the number of measurement points is significantly reduced or prevented. Furthermore, even when a device used to calculate the allowable range of the measurement parameter is not the same as a device actually used at the mass production site and there is an individual difference between the devices, an error due to the individual difference between the devices assumed by the device actually used is added to the distribution of the measurement quality indicator such that the range of the measurement parameter suitable for the device to be used can be easily calculated.

A program according to a second aspect of the present invention is configured to cause a computer to estimate and acquire a measurement result under another measurement condition using a model formula based on measurement results under a plurality of measurement conditions with different measurement parameter conditions for measuring a sample, and to cause the computer to estimate a distribution of a measurement quality indicator with respect to a measurement parameter based on the estimated measurement result. The program may be provided in the form of a storage medium in which the program has been stored.

A measurement parameter setting assistance device according to a third aspect of the present invention includes an arithmetic device configured to estimate and acquire a measurement result under another measurement condition using a model formula based on measurement results under a plurality of measurement conditions with different measurement parameter conditions for measuring a sample, the arithmetic device being configured to estimate a distribution of a measurement quality indicator with respect to a measurement parameter based on the estimated measurement result.

Effect of the Invention

According to the present invention, as described above, the allowable range of the measurement parameter can be accurately calculated while an increase in the number of measurement points is significantly reduced or prevented.

MODES FOR CARRYING OUT THE INVENTION

An embodiment embodying the present invention is hereinafter described on the basis of the drawings.
Configuration of Sample Measurement Device The configuration of a sample measurement device 100 according to this embodiment is now described with reference to FIGS. 1 to 5.

Figure 1:
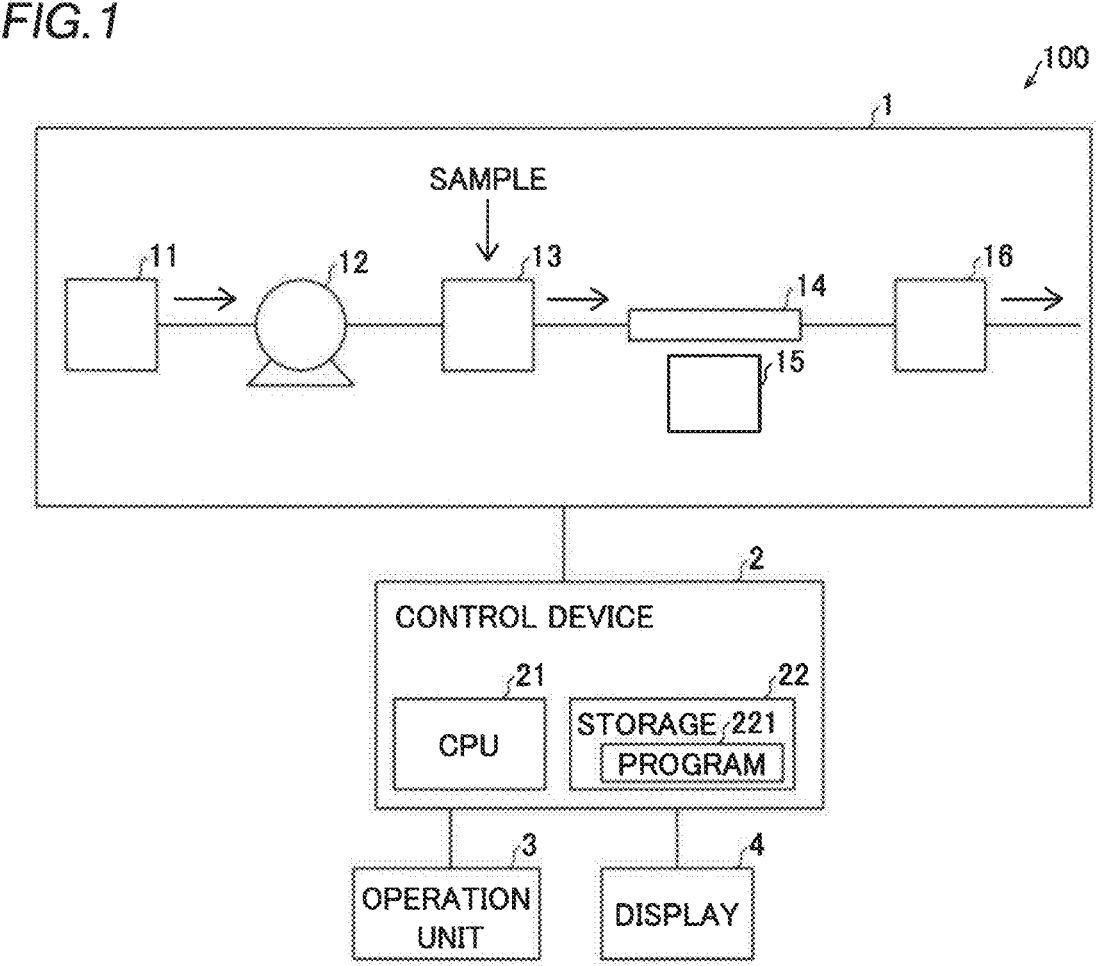
FIG. 1 is a block diagram schematically showing a sample measurement device according to an embodiment of the present invention.

As shown in FIG. 1, the sample measurement device 100 includes a chromatograph 1 and a control device 2. The sample measurement device 100 is configured to detect and analyze components in a sample. The chromatograph 1 is configured to measure the sample. Furthermore, the control device 2 is configured to analyze the measurement results of the chromatograph 1. The chromatograph 1 is an example of a "measurement unit" in the claims. The control device 2 is an example of a "controller" or a "measurement parameter setting assistance device" in the claims.

The chromatograph 1 includes a mobile phase supply unit 11, a pump 12, a sample supply unit 13, a column 14, a temperature control unit 15, and a detector 16. The control device 2 includes a central processing unit (CPU) 21 and a storage 22. An operation unit 3 and a display 4 are connected to the control device 2. The CPU 21 is an example of an "arithmetic device" in the claims.

In the chromatograph 1, the mobile phase supply unit 11, the pump 12, the sample supply unit 13, the column 14, and the detector 16 are connected by liquid feeding pipes. The mobile phase supply unit 11 is configured to adjust a mobile phase (solvent solution) to a predetermined concentration and supply the same. The pump 12 is configured to adjust the flow rate of the mobile phase to feed the mobile phase toward the column 14. In the sample supply unit 13, the sample is supplied into the mobile phase at the predetermined timing. In the column 14, the sample is moved. At this time, the moving speed differs depending on the component of the sample, and thus each component (substance) is separated, and reaches the detector 16.

The temperature control unit 15 is configured to adjust the temperature of the column 14. Specifically, the temperature control unit 15 is configured to heat or cool the column 14 to a predetermined temperature. The detector 16 is configured to detect each component in the sample that moves through the column 14 and reaches the detector 16. The detector 16 detects each component in the sample by measuring the absorption spectrum, the refractive index, or the scattering of light, for example. The detector 16 includes a flow cell. The detector 16 is configured to transmit the detection results to the control device 2.

The control device 2 is configured to control each portion of the chromatograph 1. The control device 2 includes a computer. Specifically, the CPU 21 of the control device 2 is configured to control the chromatograph 1 based on a program 221 stored in the storage 22. The control device 2 is configured to receive an operation from an operator through the operation unit 3. The control device 2 is configured to control the display 4 to display a screen for operation, the measurement results, etc.

The control device 2 is used to set a measurement condition (analysis method) suitable for repeated measurement of samples that are mixtures of the same substance group but have different concentration ratios. In the development of such an analysis method, it is necessary to develop an analysis method that guarantees a sufficient peak resolution in each measurement. Specifically, it is necessary to optimally set analytical parameters such as pH, temperature, and solvent concentration based on the resolution.

However, when only the resolution is used as a reference, the analysis time generally becomes long, and thus both the resolution and the analysis completion time may be optimized, or other costs such as mobile phase solvent and heater power may be incorporated for optimization.

The control device 2 is configured to estimate and acquire a measurement result under another measurement condition using a model formula based on the measurement results under a plurality of measurement conditions in which the measurement parameter conditions are different from each other. Furthermore, the control device 2 is configured to estimate the distribution of a measurement quality indicator with respect to measurement parameters based on the estimated measurement result. The control device 2 is also configured to calculate the range of the measurement parameters according to the allowable range of the measurement quality indicator based on the distribution of the measurement quality indicator.

That is, based on the program 221, the control device 2 estimates and acquires the measurement result under another measurement condition using the model formula based on the measurement results under the plurality of measurement conditions in which the measurement parameter conditions for measuring the sample are different from each other, and estimates the distribution of the measurement quality indicator with respect to the measurement parameters based on the estimated measurement result.

The control device 2 is configured to display the range of the measurement parameters according to the allowable range of the measurement quality indicator using a Bayesian design space based on the distribution of the measurement quality indicator. Furthermore, the control device 2 is configured to display a plurality of ranges of the measurement parameters according to the allowable ranges of a plurality of measurement quality indicators different from each other based on the distribution of the measurement quality indicator. For example, the control device 2 is configured to display the ranges of measurement parameters according to different percentiles as the allowable ranges.

The control device 2 is configured to calculate a candidate of the measurement condition to be measured next in order to update the range of the measurement parameters based on the distribution of the measurement indicator or the calculated range of the measurement parameters. Specifically, the control device 2 obtains the design space (the allowable range of the measurement parameters) from measurement points up to an nth point as in the Bayesian optimization, and determines, as a measurement point, an (n+1)th point that is expected to further clarify the vicinity of a promising area as a measurement condition to be adopted based on information about the design space.

The control device 2 is configured to estimate a chromatogram peak resolution and a retention time as measurement quality indicators. The chromatogram peak resolution is calculated from the retention times and peak widths of two peaks of interest. For example, the resolution R is expressed by a formula (1) using peak widths W1 and W2 and the retention times rt1 and rt2 (where rt1<rt2) of the peak widths.

$$R=2(rt2-rt1)/(W1+W2) \quad (1)$$

A larger value of the resolution indicates larger separation. For example, when the resolution is 1.5 or higher, it is considered to be completely separated. The retention time is calculated from the retention time of the latest detected peak.

The control device 2 is configured to estimate the distribution of the measurement quality indicator using Bayesian estimation.

Specifically, the control device 2 estimates a measurement result using the model formula in order to interpolate between the actually measured measurement points. As the measurement result, the retention time (Rtime) and the peak width of the chromatograph are obtained, for example. The measurement parameters include a solvent concentration x0 and a temperature x1. For example, the retention time rt(x) is estimated by a model formula such as a formula (2):

$$rt(x)=\exp(p0+p1*x0+p2*x1)+p3 \quad (2)$$

where p0, p1, p2, and p3 represent coefficients (parameters) of the model formula for estimating the retention time. Note that p0, p1, p2, and p3 each have a distribution, and thus the estimated retention time rt(x) also has a distribution.

The peak width w(x) is estimated by a model formula such as a formula (3):

$$w(x)=\exp(q0+q1*x0+q2*x1)+q3 \quad (3)$$

where q0, q1, q2, and q3 represent coefficients (parameters) of the model formula for estimating the peak width. Note that q0, q1, q2, and q3 each have a distribution, and thus the estimated peak width w(x) also has a distribution.

The model formulas for estimating the retention time and the peak width are not limited to the exponential functions as described above, but may be polynomials or kernel regressions such as Gaussian kernel regressions. The model formulas for estimating the retention time and the peak width are functions (exponential functions) of the same shape, but may be functions of different shapes.

In estimating the value, an error ε is further introduced as in y=rt(X)+ε. Although it is assumed that an error occurs in the observed retention time and peak width, y=rt(X+ε) in which an error is added to x in consideration of a solvent concentration error and a temperature control error may be used. In Bayesian estimation, Bayesian estimation by sampling is performed, but another sampling algorithm may be used or Bayesian estimation by variational Bayes or the like may be used.

Figure 2:
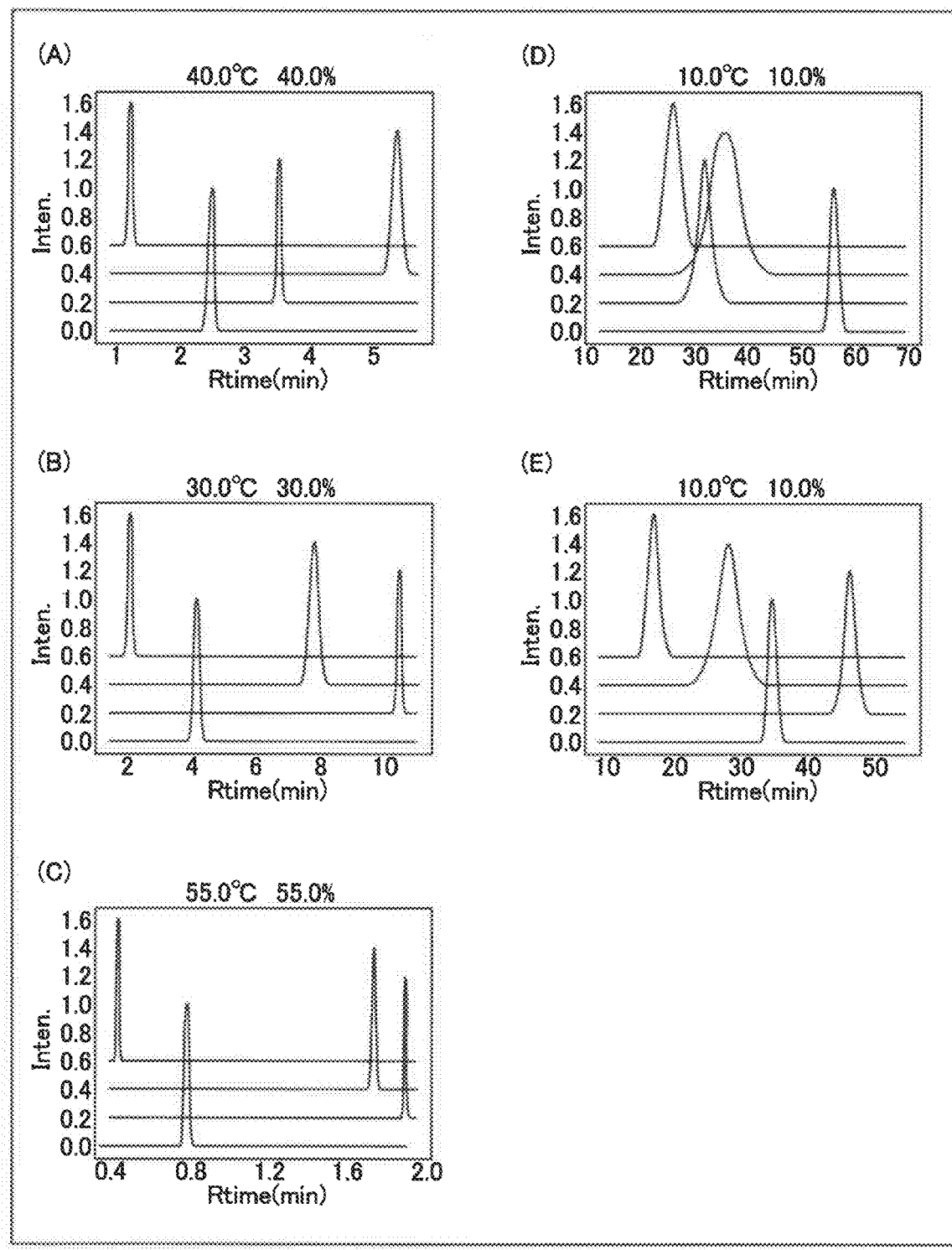
FIG. 2 is a diagram for illustrating an example of the retention time and peak width prediction of the sample measurement device according to the embodiment of the present invention.

The retention time and the peak width are estimated using the model formulas such that a plurality of estimation results as shown in FIG. 2 can be obtained. FIG. 2A shows an estimation result under a measurement condition at a temperature of 40.0° C. and a solvent concentration of 40.0%. FIG. 2B shows an estimation result under a measurement condition at a temperature of 30.0° C. and a solvent concentration of 30.0%. FIG. 2C shows an estimation result under a measurement condition at a temperature of 55.0° C. and a solvent concentration of 55.0%. FIG. 2D shows an estimation result under a measurement condition at a temperature of 10.0° C. and a solvent concentration of 10.0%. FIG. 2E shows another measurement result under the measurement condition at a temperature of 10.0° C. and a solvent concentration of 10.0%. The coefficients of the model formulas each have a distribution, and thus a plurality of measurement results are estimated even under the same measurement condition.

Figure 3:
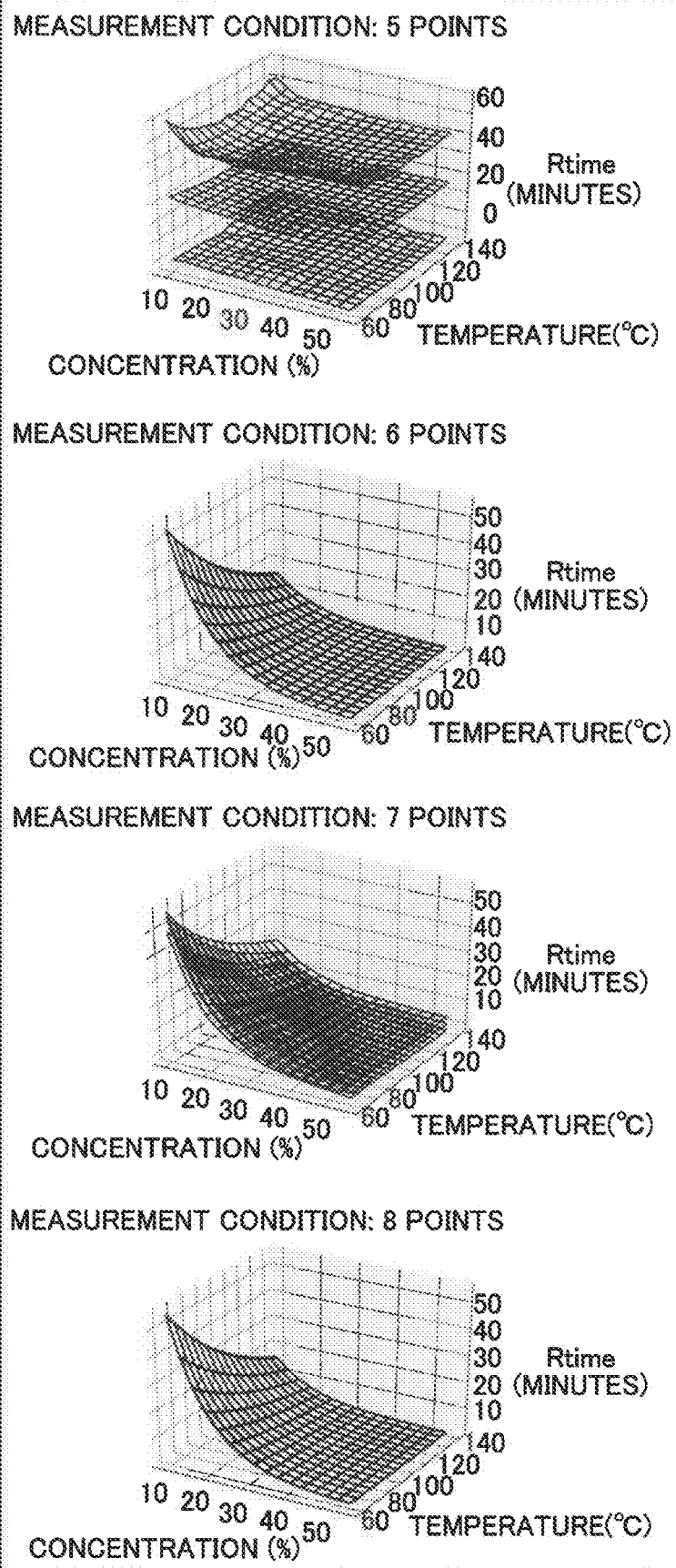
FIG. 3 is a diagram showing an example of a response surface of the retention time of the sample measurement device according to the embodiment of the present invention.

FIG. 3 shows an example of a response surface of the retention time with respect to the solvent concentration and the temperature. In the example of FIG. 3, the response surface is shown by plotting the 5th, 50th, and 95th percentile points in the retention time (Rtime) when the measurement conditions are five points, six points, seven points, and eight points.

Figure 4:
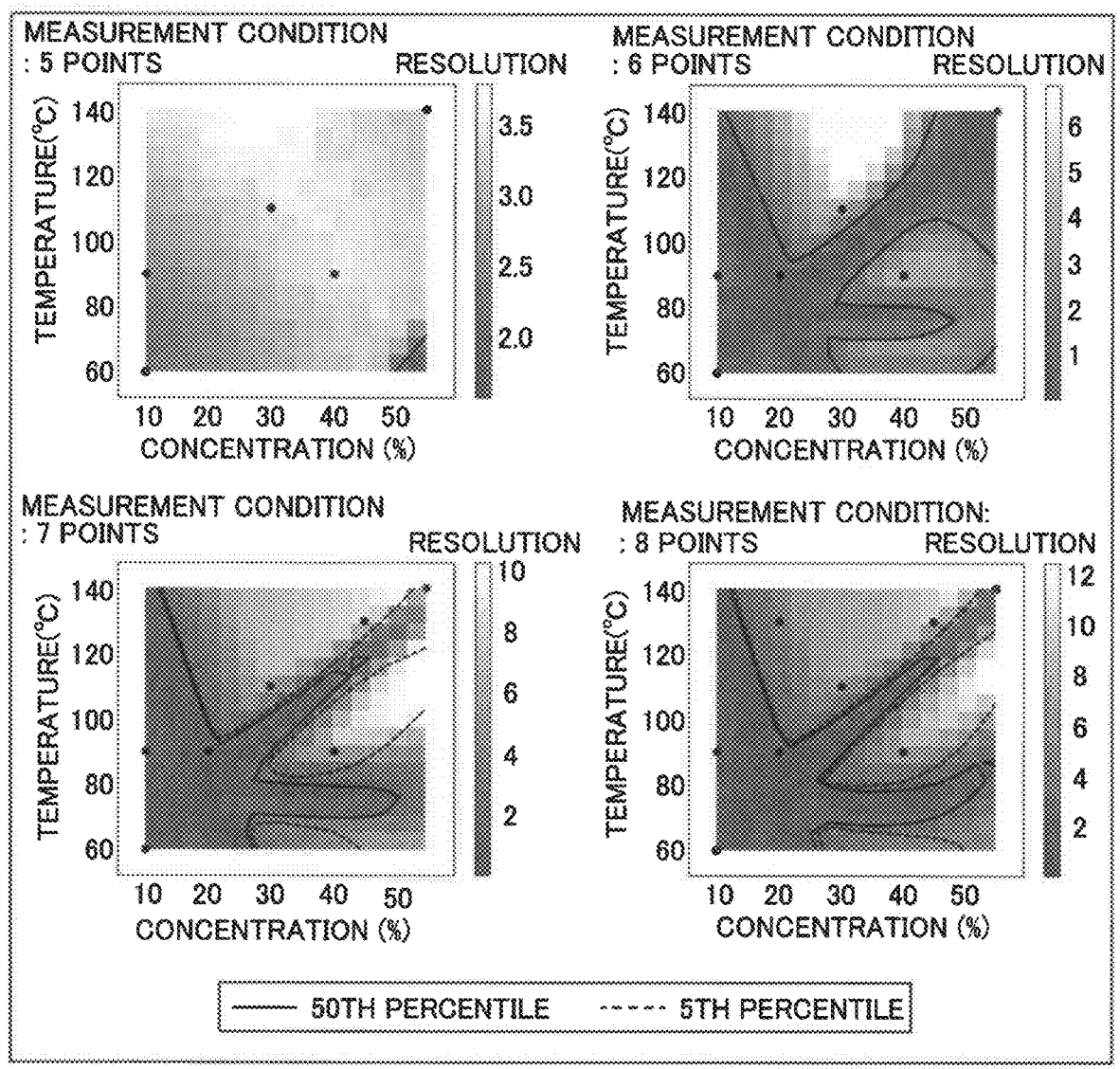
FIG. 4 is a diagram showing a first example of displaying the allowable range of measurement parameters of the sample measurement device according to the embodiment of the present invention.

The predicted amounts of retention time and peak width are generated from the estimated amounts obtained by estimation using the model formulas. Furthermore, the peak resolution is generated using the generated predicted amounts. FIG. 4 shows boundary lines with a resolution of 2.0 drawn on the generated distribution obtained in this manner at the 50th percentile and the 5th percentile. Most of the boundary at the 50th percentile, which is the median, is determined to have a resolution of 2 or higher when the number of measurement points is five. However, it can be seen that there is no boundary at the 5th percentile and the reliability is low. As the number of measurement points increases, dashed lines of the 5th percentile become visible. Furthermore, the lines of the 50th and 5th percentiles approach each other (the width of the distribution of the resolution becomes smaller), and thus it can be seen that sufficiently reliable boundary lines are formed.

In increasing the number of observation points sequentially in this manner, a user may determine the measurement points in consideration of the promising boundary lines with reference to the design space and the time and effort required for sample preparation, for example. The measurement points may also be automatically determined using an acquisition function used for Bayesian optimization. Furthermore, using the obtained model formulas (the estimated amounts of parameters), an observed value at each measurement point may be predicted, and from the predicted amount, the Bayesian approach may be adopted in which a measurement point at which the range of the 5th percentile is wider is adopted.

Figure 5:
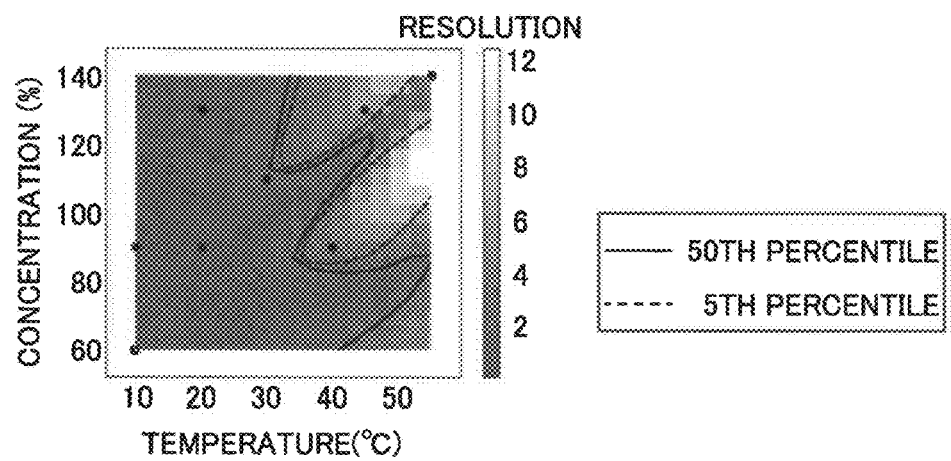
FIG. 5 is a diagram showing a second example of displaying the allowable range of the measurement parameters of the sample measurement device according to the embodiment of the present invention.

As shown in FIG. 5, the design space may be generated and displayed in consideration of the analysis time. In an example of FIG. 5, when the maximum retention time is three minutes or less, the resolution is used to generate the design space. When the maximum retention time is three minutes or more, (resolution)*(three minutes)/(maximum retention time) is used as a quality indicator value to generate the design space. Consequently, in the example of FIG. 6, the boundary lines of the 5th percentile are gathered in the upper right corner at which the retention time is shorter as compared with the example of FIG. 5.

Design Space Creation Process

A design space creation process by the control device 2 is described with reference to FIG. 6.

Figure 6:
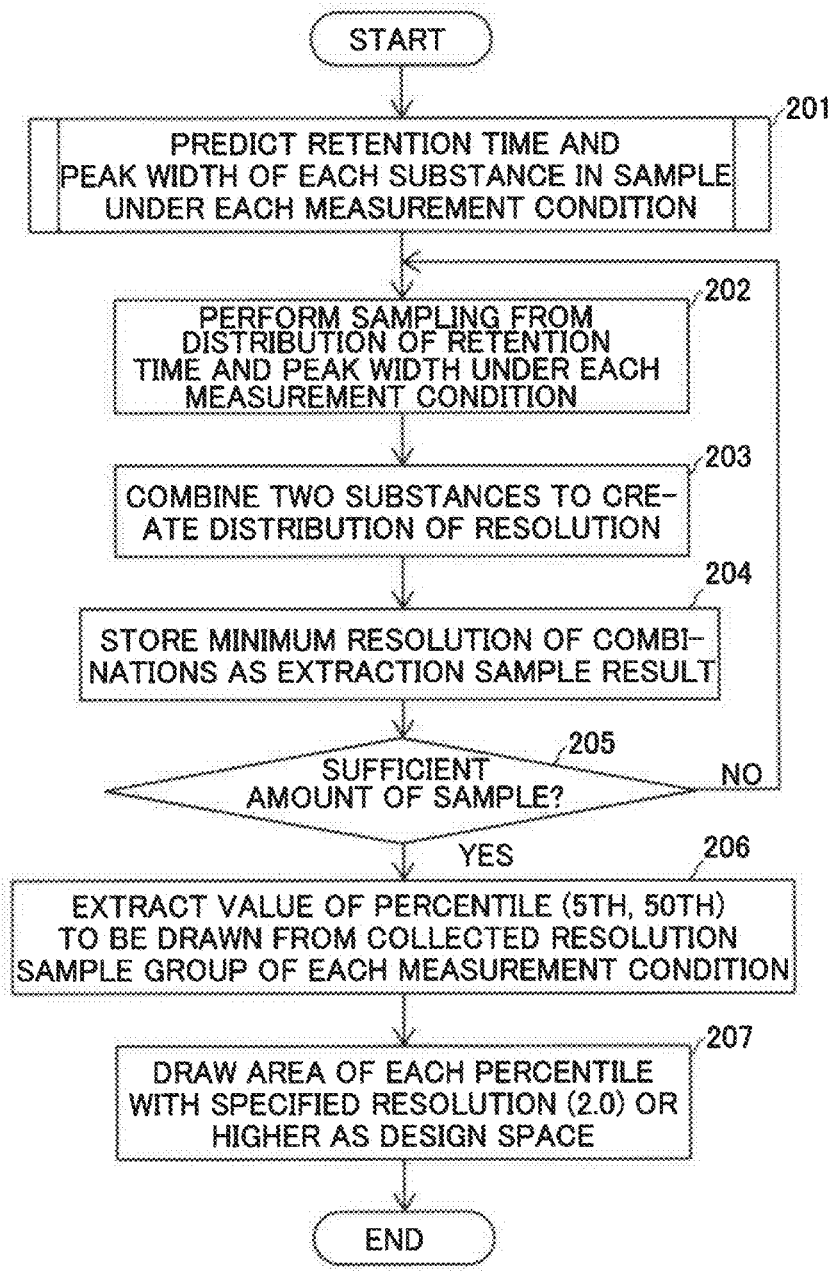
FIG. 6 is a flowchart for illustrating a design space creation process by a controller of the sample measurement device according to the embodiment of the present invention.

In step 201 of FIG. 6, the control device 2 predicts the retention time and the peak width of each substance in the sample under each measurement condition based on a plurality of measurement results actually measured. In step 202, the control device 2 randomly samples the value of the retention time and the value of the peak width from the distribution of the retention time and the peak width under each measurement condition.

In step 203, the control device 2 combines two substances in the sample to create a distribution of the resolution of the two combined substances. For example, when there are four substances in the sample and two are selected from the four, six combinations are obtained. In step 204, the control device 2 stores the minimum resolution of the combinations as an extraction sample result. That is, the resolution between two substances having the shortest peak distance (time) is taken as a resolution as a measurement quality indicator under the measurement condition.

In step 205, the control device 2 determines whether or not the amount of sample is sufficient. When the amount of sample is sufficient, the control device 2 advances to step 206, and when the amount of sample is not sufficient, the control device 2 returns to step 202. In step 206, the control device 2 extracts the values of the resolutions of the percentiles (5th percentile and 50th percentile) to be drawn from the collected resolution sample group of each measurement condition. The value of the 5th percentile is a value corresponding to the 5th % from the smallest of the distribution data. The value of the 50th percentile is a value corresponding to the 50th % (half) from the smallest of the distribution data.

In step 207, the control device 2 draws an area of each percentile with a specified resolution (2.0) or higher as the design space. Then, the design space creation process is terminated. The process operations in step 201 to step 207 are repeated each time the number of measurement points is increased.

Retention Time/Peak Width Prediction Process

A retention time/peak width prediction process by the control device 2 is described with reference to FIG. 7. The retention time/peak width prediction process shown in FIG. 7 is a detailed description of the process operation in step 201 of FIG. 6.

Figure 7:
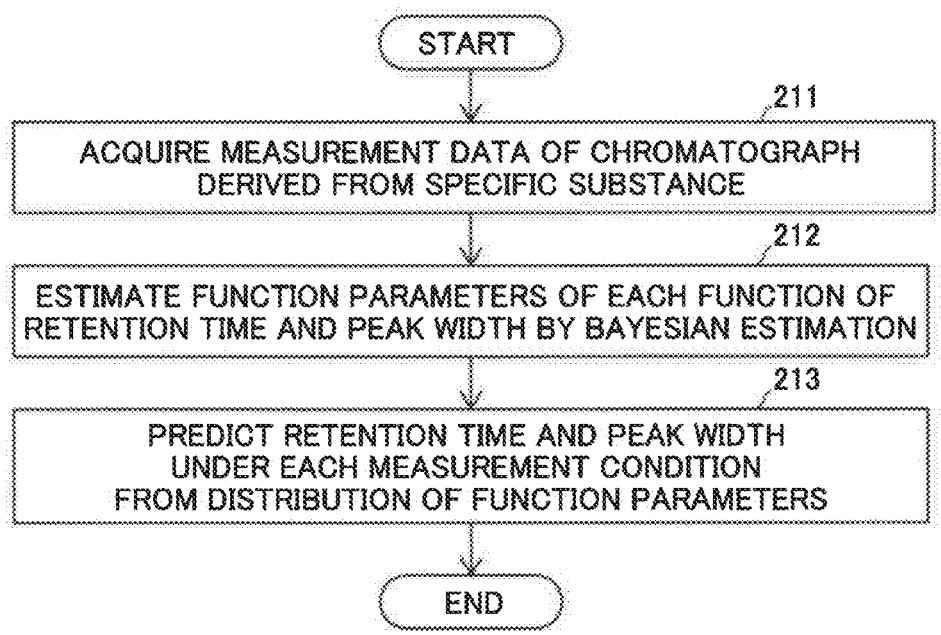
FIG. 7 is a flowchart for illustrating a retention time/peak width prediction process by the controller of the sample measurement device according to the embodiment of the present invention.

In step 211 of FIG. 7, the control device 2 acquires the measurement data of the chromatograph derived from the specific substance. In step 212, the control device 2 estimates the function parameters of each function of the retention time and the peak width by Bayesian estimation. In step 213, the control device 2 predicts the retention time and the peak width under each measurement condition from the distribution of the function parameters. Then, the retention time/peak width prediction process is terminated.

Advantages of this Embodiment

In this embodiment, the following advantages are obtained.

In this embodiment, as described above, the control device 2 is configured to estimate and acquire the measurement result under another measurement condition using the model formula based on the measurement results under the plurality of measurement conditions with the different measurement parameter conditions, and estimate the distribution of the measurement quality indicator with respect to the measurement parameters based on the estimated measurement result. Accordingly, a safety factor can be set statistically based on the distribution of the measurement quality indicator, and thus the necessary and sufficient safety factor can be easily set based on the statistics without excessively narrowing the allowable range of the measurement parameters. Consequently, the allowable range of the measurement parameters can be accurately calculated. Moreover, the measurement result can be estimated using the model formula, and thus the allowable range of the measurement parameters can be calculated without excessively increasing the number of measurement points. Thus, the allowable range of the measurement parameters can be accurately calculated while an increase in the number of measurement points is significantly reduced or prevented. Furthermore, even when a device used to calculate the allowable range of the measurement parameters is not the same as a device actually used at the mass production site and there is an individual difference between the devices, an error due to the individual difference between the devices assumed by the device actually used is added to the distribution of the measurement quality indicator such that the range of the measurement parameters suitable for the device to be used can be easily calculated.

In this embodiment, as described above, the control device 2 is configured to calculate the range of the measurement parameters according to the allowable range of the measurement quality indicator based on the distribution of the measurement quality indicator. Accordingly, the range of the measurement parameters according to the allowable range of the measurement quality indicator can be easily calculated.

In this embodiment, as described above, the control device 2 is configured to display the range of the measurement parameters according to the allowable range of the measurement quality indicator using the Bayesian design space based on the distribution of the measurement quality indicator. Accordingly, the design space of the measurement parameters can be calculated accurately using Bayesian estimation. Furthermore, an appropriate measurement condition can be easily determined based on the displayed Bayesian design space.

In this embodiment, as described above, the control device 2 is configured to display the plurality of ranges of the measurement parameters according to the allowable ranges of the plurality of measurement quality indicators different from each other based on the distribution of the measurement quality indicator. Accordingly, an appropriate measurement condition can be more easily determined based on the displayed allowable ranges of the plurality of measurement quality indicators.

In this embodiment, as described above, the control device 2 is configured to calculate the candidate of the measurement condition to be measured next in order to update the range of the measurement parameters based on the distribution of the measurement indicator or the calculated range of the measurement parameters. Accordingly, the next measurement condition can be easily determined based on the calculated candidate of the measurement condition. Furthermore, the measurement is performed based on the calculated candidate of the measurement condition such that the measurement parameters according to the allowable range of the measurement quality indicator can be more accurately calculated.

In this embodiment, as described above, the control device 2 is configured to estimate the measurement quality indicator including at least one of the chromatogram peak resolution or the retention time. Accordingly, in measurement by the chromatograph, the allowable range of the measurement parameters of at least one of the chromatogram peak resolution or the retention time can be accurately calculated.

In this embodiment, as described above, the measurement parameters include at least one of the temperature, the solvent concentration, or the pH. Accordingly, in measurement by the chromatograph 1, the allowable range of at least one of the temperature, the solvent concentration, or the PH can be accurately calculated.

In this embodiment, as described above, the control device 2 is configured to estimate the distribution of the measurement quality indicator using Bayesian estimation. Accordingly, the distribution of the measurement quality indicator can be easily estimated by Bayesian estimation.

MODIFIED EXAMPLES

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the example in which the measurement unit includes the chromatograph has been shown in the aforementioned embodiment, the present invention is not limited to this. In the present invention, the measurement unit may measure the sample by a principle other than the chromatograph.

While the example in which the chromatogram peak resolution and the retention time are used as the measurement quality indicators has been shown in the aforementioned embodiment, the present invention is not limited to this. In the present invention, as the measurement quality indicator, at least one of the chromatogram peak resolution or the retention time may be used, or another indicator may be used.

While the example in which the temperature and the solvent concentration are used as the measurement parameters has been shown in the aforementioned embodiment, the present invention is not limited to this. In the present invention, as the measurement parameter, at least one of the temperature, the solvent concentration, or the pH may be used, or another measurement parameter may be used.

While the example in which the measurement result is estimated using Bayesian estimation to estimate the distribution of the measurement quality indicator has been shown in the aforementioned embodiment, the present invention is not limited to this. In the present invention, the distribution of the measurement quality indicator may be estimated by a method other than Bayesian estimation.

While the example in which the range of the measurement parameters according to the allowable range of the measurement quality indicator is displayed using the Bayesian design space has been shown in the aforementioned embodiment, the present invention is not limited to this. In the present invention, the range of the measurement parameters according to the allowable range of the measurement quality indicator may be displayed by a method other than the Bayesian design space.

While the example in which the two ranges of the measurement parameters according to the allowable ranges of the two measurement quality indicators different from each other are displayed has been shown in the aforementioned embodiment, the present invention is not limited to this. In the present invention, the range of the measurement parameters according to the allowable range of one measurement quality indicator may be displayed, or the three or more ranges of the measurement parameters according to the allowable ranges of three or more measurement quality indicators may be displayed.

While the process operations of the controller according to the present invention are described using a flowchart in a flow-driven manner in which processes are performed in order along a process flow for the convenience of illustration in the aforementioned embodiment, the present invention is not limited to this. In the present invention, the process operations of the controller may be performed in an event-driven manner in which the processes are performed on an event basis. In this case, the process operations may be performed in a complete event-driven manner or in a combination of an event-driven manner and a flow-driven manner.

DESCRIPTION OF REFERENCE NUMERALS

1: chromatograph (measurement unit)
2: control device (controller, measurement parameter setting assistance device)
21: CPU (arithmetic device)
23: storage
100: sample measurement device

The invention claimed is:
1. A sample measurement device comprising:
a measurement unit configured to measure a sample; and
a controller configured to analyze a measurement result of the measurement unit; wherein
the controller is configured to estimate and acquire a measurement result under another measurement condition using a model formula based on measurement results under a plurality of measurement conditions with different measurement parameter conditions, and estimate a distribution of a measurement quality indicator with respect to a measurement parameter based on the estimated measurement result, wherein the controller is configured to calculate a range of the measurement parameter according to an allowable range of the measurement quality indicator based on the distribution of the measurement quality indicator, and wherein the controller is configured to adjust the measurement parameter based on the calculated range or display the calculated range.

2. The sample measurement device according to claim 1, wherein the controller is configured to display the range of the measurement parameter according to the allowable range of the measurement quality indicator using a Bayesian design space based on the distribution of the measurement quality indicator.

3. The sample measurement device according to claim 1, wherein the controller is configured to display a plurality of ranges of measurement parameters according to allowable ranges of a plurality of measurement quality indicators different from each other based on the distribution of the measurement quality indicator.

4. The sample measurement device according to claim 1, wherein the controller is configured to calculate a candidate of a measurement condition to be measured next in order to update the range of the measurement parameter based on the distribution of the measurement quality indicator or the calculated range of the measurement parameter.

5. The sample measurement device according to claim 1, wherein
the measurement unit includes a chromatograph; and
the controller is configured to estimate the measurement quality indicator including at least one of a chromatogram peak resolution or a retention time.

6. The sample measurement device according to claim 5, wherein the measurement parameter includes at least one of a temperature, a solvent concentration, or a pH.

7. The sample measurement device according to claim 1, wherein the controller is configured to estimate the distribution of the measurement quality indicator using Bayesian estimation.

8. The sample measurement device according to claim 1, wherein the controller is configured to adjust the measurement parameter based on the calculated range.

9. The sample measurement device according to claim 1, wherein the controller is configured to display the calculated range.

10. A measurement parameter setting assistance device comprising:
an arithmetic device configured to estimate and acquire a measurement result under another measurement condition using a model formula based on measurement results under a plurality of measurement conditions with different measurement parameter conditions for measuring a sample, the arithmetic device being configured to estimate a distribution of a measurement quality indicator with respect to a measurement parameter based on the estimated measurement result,
wherein the arithmetic device is configured to calculate a range of the measurement parameter according to an allowable range of the measurement quality indicator based on the distribution of the measurement quality indicator, and
wherein the arithmetic device is configured to adjust the measurement parameter based on the calculated range or display the calculated range.

* * * * *